United States Patent
Seibold et al.

(10) Patent No.: US 6,375,245 B1
(45) Date of Patent: Apr. 23, 2002

(54) VEHICLE SEATING SYSTEM HAVING CHUCK REDUCING APPARATUS

(75) Inventors: Kurt A. Seibold, South Lyon; Travis W. Simmons, Novi, both of MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/685,450

(22) Filed: Oct. 9, 2000

(51) Int. Cl.⁷ .................................................. B60N 2/02
(52) U.S. Cl. .................. 296/65.03; 297/336; 248/503.1
(58) Field of Search .................... 296/65.03; 248/503.1; 297/331, 335, 336

(56) References Cited

U.S. PATENT DOCUMENTS

| | | | |
|---|---|---|---|
| 1,617,901 A | 2/1927 | Freise | 297/14 |
| 4,527,828 A | 7/1985 | Groce et al. | 296/65.09 |
| 4,636,003 A * | 1/1987 | Siebler | 297/336 |
| 4,838,513 A * | 6/1989 | Kondo | 248/503.1 |
| 4,865,377 A | 9/1989 | Musser et al. | 296/65.03 |
| 5,282,662 A | 2/1994 | Bolsworth et al. | 296/65.03 |
| 5,393,116 A | 2/1995 | Bolsworth et al. | 473/224 |
| 5,482,345 A | 1/1996 | Bolsworth et al. | 296/65.03 |
| 5,547,242 A * | 8/1996 | Dukatz et al. | 296/65.03 |
| 5,577,805 A | 11/1996 | Glinter et al. | 297/378.12 |
| 5,626,391 A | 5/1997 | Miller et al. | 297/331 |
| 5,634,686 A | 6/1997 | Okazaki | 297/336 |
| 5,730,480 A | 3/1998 | Takamura | 248/503.1 |
| 5,765,894 A | 6/1998 | Okazaki et al. | 296/65.03 |
| 5,775,763 A | 7/1998 | Glinter et al. | 296/65.03 |
| 5,803,549 A | 9/1998 | Bolsworth et al. | 297/463.1 |
| 5,951,086 A | 9/1999 | Hoshino et al. | 296/65.03 |
| 5,975,611 A | 11/1999 | Hoshihara et al. | 296/65.03 |
| 5,997,069 A | 12/1999 | Coffey et al. | 296/65.03 |
| 6,000,742 A | 12/1999 | Schaefer et al. | 296/65.09 |
| 6,039,401 A * | 3/2000 | Rus | 296/65.03 X |
| 6,065,804 A * | 5/2000 | Tanaka et al. | 297/336 |
| 6,152,515 A * | 11/2000 | Wieclawski | 296/65.03 |
| 6,196,611 B1 * | 3/2001 | Lee | 296/65.03 |
| 6,213,525 B1 * | 4/2001 | Nicola | 296/65.03 X |
| 6,220,665 B1 * | 4/2001 | Dingel | 296/65.03 X |

FOREIGN PATENT DOCUMENTS

DE 3724305 A1 * 1/1988 .............. 296/65.03

* cited by examiner

*Primary Examiner*—Stephen T. Gordon
*Assistant Examiner*—Patricia Engle
(74) *Attorney, Agent, or Firm*—Foley & Lardner

(57) ABSTRACT

A seating system for a vehicle having a vehicle floor. The seating system includes a mounting member and a frame assembly. The mounting member is configured to be fixedly coupled to the vehicle floor. The frame assembly has a mounting structure with a mounting leg, an isolator and a compression lever. The mounting leg has a slotted aperture into which a portion of the mounting member is disposed. The isolator is coupled to one of the mounting leg and the compression lever. The compression lever is pivotably mounted to the mounting structure such that rotation of the compression lever in a first rotational direction positions the isolator in an engaged condition wherein at least a portion of the isolator is compressed against the mounting member. Rotation of the compression lever in a second rotational direction positions the isolator in a disengaged condition wherein the isolator is disengaged from the mounting member.

19 Claims, 3 Drawing Sheets

VEHICLE SEATING SYSTEM HAVING CHUCK REDUCING APPARATUS

BACKGROUND OF THE INVENTION

The present invention relates generally to vehicle seating systems and more particularly to a vehicle seating system with a chuck (tilt) reducing apparatus.

Modernly, it has become highly desirable to provide vehicles such as mini-vans, trucks, sport-utility vehicles and station wagons, that have rearwardly-situated seating systems that may be selectively removed by the vehicle owner to permit the cargo-carrying capacity of the vehicle to be increased. While the incorporation of removable seats into a vehicle has become somewhat routine, several problems have been encountered which heretofore have not been sufficiently addressed by the known art.

One such problem concerns the integration of the seat mounting members, typically cylindrical pins, into the vehicle. With the known seating systems, it is highly desirable that the seat mounting members be coupled to the vehicle floor structure in a precise relationship along three axes (i.e., the longitudinal axis of the vehicle, the lateral axis of the vehicle and the axis normal to ground) relative to a predetermined datum point. Unfortunately, variation in the fabrication of the vehicle causes the relationship of the seat mounting members to vary from vehicle to vehicle, particularly along the axis that is normal to the ground.

Prior seating systems typically compensated for the variation in the vertical height of the seat mounting members through an attachment mechanism system that would generate sufficient clamping force between the mounting members and the seat mounting structure to prevent the seating system from tipping about one of the seat mounting members. This approach, however, has several drawbacks.

In particular, these seating systems tend to be relatively heavy due so as to provide the requisite strength that is necessary to generate the clamping force that is necessary to prevent the seat mounting structure from tipping on the seat mounting members. As these seating systems tended to be relatively heavy, they are relatively more difficult for vehicle owners to install to and remove from the vehicle.

Another drawback concerns the attachment mechanism systems that were employed by these systems and the ease with which they were deployed to prevent the vehicle seating system from tipping. Typically, relatively short lever arms were employed by these attachment mechanisms to generate the clamping force that was necessary for securing the seat mounting structure to the mounting members and to prevent tipping. While the short lever arms were convenient and easily packaged within the vehicle and seating system, they can be difficult to manipulate depending upon the strength of the operator since the rate with which they multiply an input manipulating force tends to be rather small.

Accordingly, there remains a need in the art for a seating system that is relatively more tolerant of the positional relationship of the seat mounting members. There also remains a need in the art for a seating system that can be more easily manipulated to control tipping.

SUMMARY OF THE INVENTION

In one preferred form, the present invention provides a seating system for a vehicle having a vehicle floor. The seating system includes a mounting member and a frame assembly. The mounting member is configured to be fixedly coupled to the vehicle floor. The frame assembly has a mounting structure with a mounting leg, an isolator and a compression lever. The mounting leg has a slotted aperture into which a portion of the mounting member is disposed. The isolator is coupled to one of the mounting leg and the compression lever. The compression lever is pivotably mounted to the mounting structure such that rotation of the compression lever in a first rotational direction positions the isolator in an engaged condition wherein at least a portion of the isolator is compressed against the mounting member. Rotation of the compression lever in a second rotational direction positions the isolator in a disengaged condition wherein the isolator is disengaged from the mounting member.

BRIEF DESCRIPTION OF THE DRAWINGS

The various advantages of the present invention will become apparent to one skilled in the art by reading the following specification and subjoined claims and by referencing the following drawing in which:

DETAILED DESCRIPTION OF THE PREFERRED EMBODIMENT

Figure 1A:
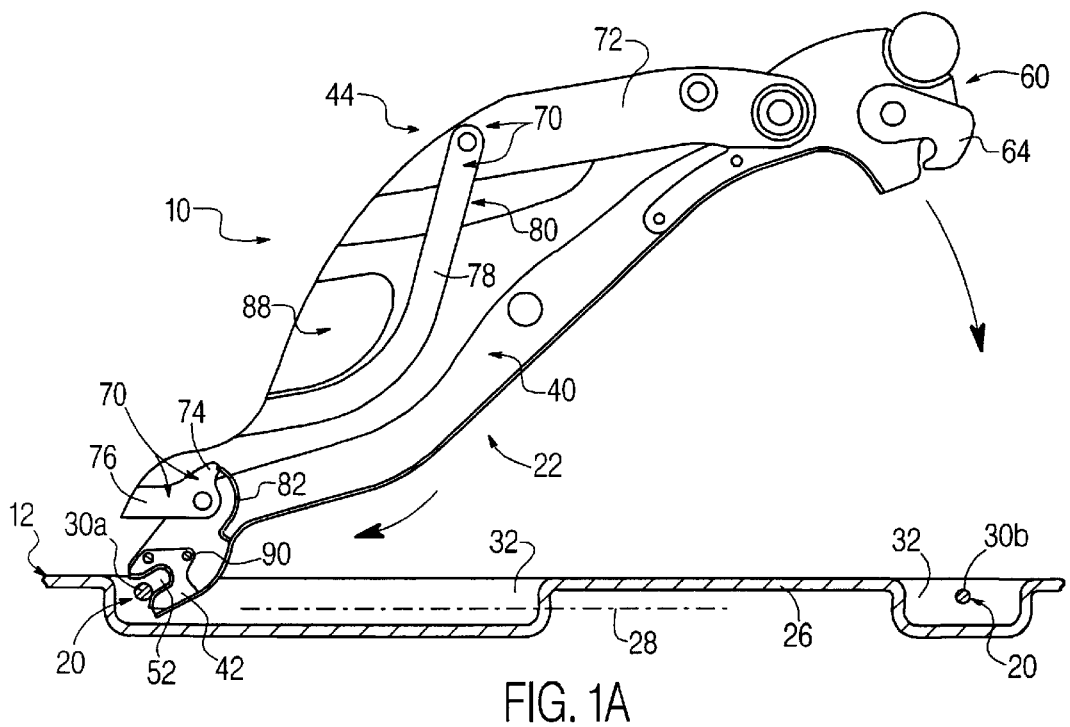
FIG. 1A is a side elevational view of a vehicle in partial cross-section illustrating a seating system constructed in accordance with the teachings of the present invention and positioned in a lowered position.

With reference to FIG. 1A of the drawings, an illustrative vehicle is shown to include a seating system 10 that is constructed in accordance with the teachings of the present invention. Although the particular vehicle illustrated is a mini-van 12, it will be understood that the teachings of the present invention have applicability to other types of vehicles, including but not limited to sport utility vehicles, and station wagons.

With additional reference to FIG. 1A, seating system 10 is shown to include a plurality of mounting members 20 and a frame assembly 22. The plurality of mounting members 20 are fixedly coupled to the vehicle floor 26 of mini-van 12 and positioned in a spaced relationship to one another along a longitudinal axis 28 of the mini-van 12. In the particular embodiment illustrated, the mounting members 20 are pins (e.g., pins 30a and 30b), each of which are disposed within a recessed pocket 32 that is formed into the vehicle floor 26.

The frame assembly 22 includes a mounting structure 40, at least one isolator 42 and a frame structure 44. The mounting structure 40 defines a 4-point base that is securable to the vehicle floor 26 at four predetermined points. The mounting structure 40 includes a pair of mounting legs 50, each of which having a slotted aperture 52 that is configured to receive a portion of a corresponding one of the mounting members 20 (e.g., pin 30a). With additional reference to FIG. 2, the slotted aperture 52 is defined by a pair of spaced apart side walls 56 that are sized to a dimension that is larger than an associated dimension of the mounting member 20 (e.g., the diameter of pin 30a) to thereby permit a first end of the mounting leg 50 to be coupled its associated mounting member 20. Due to considerations for vehicle-to-vehicle variation, the distance between the side walls 56 is typically substantially larger than the associated dimension of the mounting member 20.

Returning to FIGS. 1A and 1B, the mounting structure 40 of the particular embodiment illustrated also includes a pair of latch mechanisms 60, with each one of the latch mechanisms 60 being coupled to an associated mounting leg 50. The latch mechanisms 60 are conventional in both their construction and operation and need not be discussed in detail herein. Briefly, each latch mechanism 60 includes a hook-shaped member 64 that is pivotably coupled to its associated mounting leg 50. Each latch mechanism 60 is selectively positionable between a latched condition, wherein its associated mounting member 20 (e.g., pin 30b) is secured between the hook-shaped member 64 and the mounting leg 50 to fixedly couple mounting structure 40 to the mounting member 20, and an unlatched condition, wherein the mounting structure 40 may be freely removed from the mounting member 20.

Figure 1B:
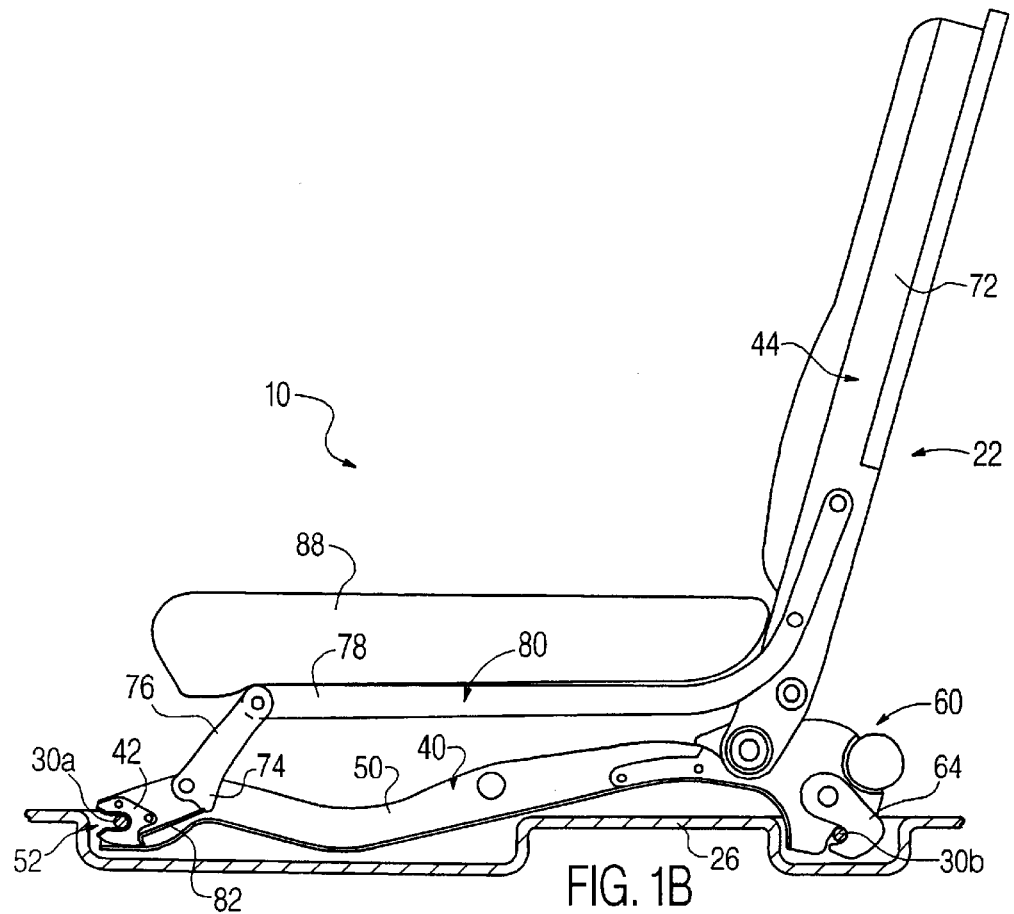
FIG. 1B is a side elevational view similar to that of FIG. 1A but illustrating the seating system fully secured to the vehicle and positioned in a raised position.

The frame structure 44 includes a plurality of link members 70, including a seat back 72, a compression lever 74, a vertical support member 76 and a lateral support member 78, which collectively form a linkage assembly 80. In the particular embodiment illustrated, the compression lever 74 is shown to include a contact arm 82 which is fixedly coupled to a vertical support member 76 and operable for engaging the isolator 42. The linkage assembly 80 is pivotably coupled to the mounting structure 40 and permits the seating system 10 to be positioned between a raised position (FIG. 1A) and a lowered position (FIG. 1B). In the particular example provided, linkage assembly 80, the vertical support member 76 and the lateral support member 78 support a generally horizontal seating portion 88 of the seating system 10. Rotation of the seat back 72 generates motion within the linkage assembly 80 that causes the compression lever 74 to rotate in first and second rotational directions.

As shown, the isolator 42 is coupled to the mounting leg 50, but it may also be coupled to the compression lever 74, as will be discussed in greater detail, below. In the particular embodiment provided, the isolator 42 is formed from a resilient material, such as rubber or silicone and is coupled to the mounting leg 50 via a pair of rivets 90. With additional reference to FIG. 2, the isolator 42 includes a receiving aperture 92 that is also dimensioned to receive pin 30a. The receiving aperture 92 defines at least one contact portion 94, with the contact portion 94 being positioned proximate an associated one of the side walls 56 of the slotted aperture 52.

The seating system 10 is placed in the lowered position and positioned in mini-van 12 such that pin 30a is disposed within slotted aperture 52 and the latch mechanism 60 is secured to pin 30b. In this condition, seating system 10 is secured to the vehicle floor 26 in a manner where the seating system 10 cannot be substantially moved in a direction parallel or perpendicular the longitudinal axis of the mini-van, but can be tipped about one of the plurality of mounting members 20 due to the size of the slotted apertures 52. As the seating system 10 is not intended to be used for the seating of vehicle occupants when it is in the lowered position, and as the seating system 10 has a relatively low center of gravity when positioned in the lowered position, the fact that the seating system 10 can tip somewhat about the mounting members 20 is not considered detrimental.

Figure 2:
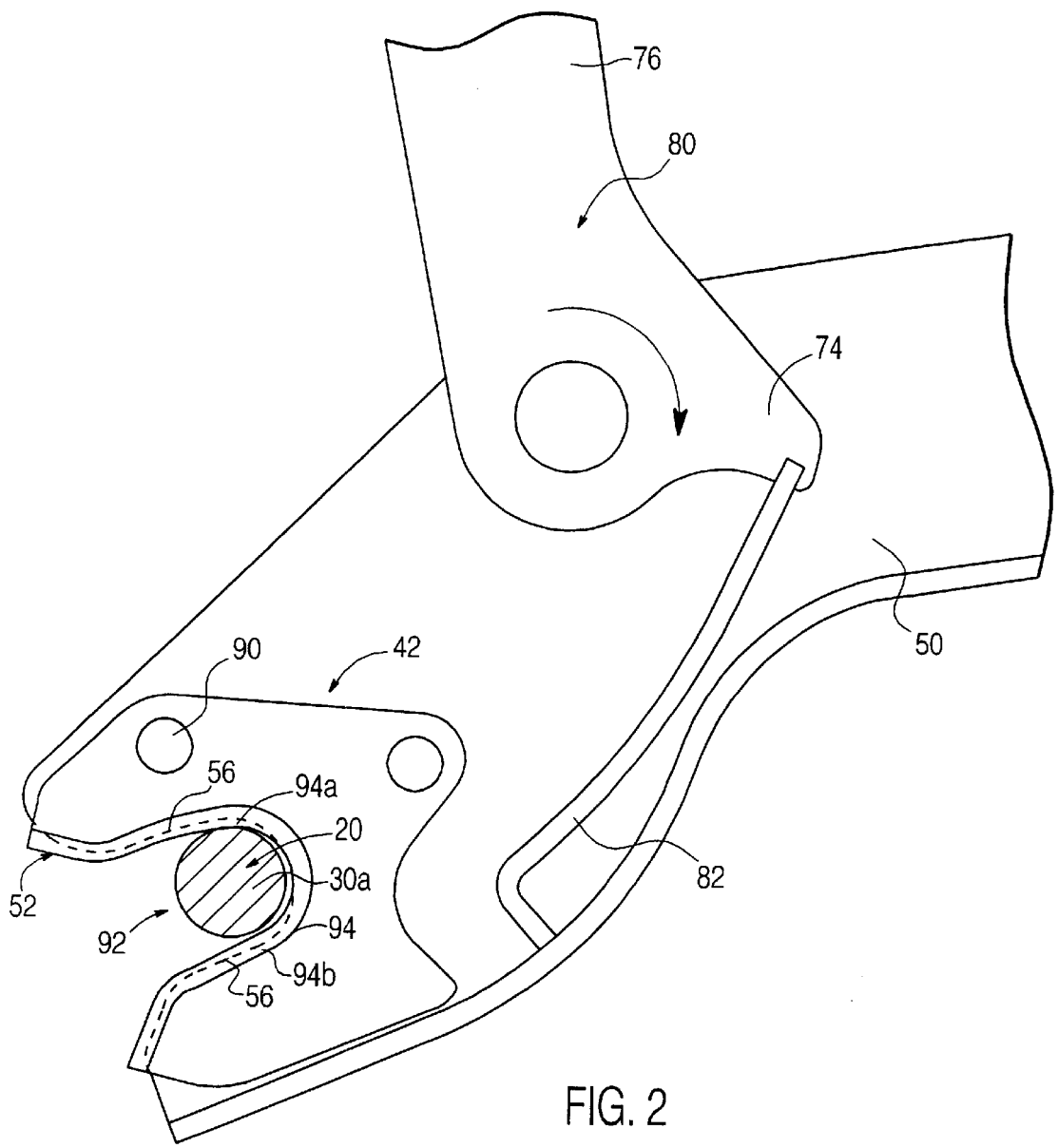
FIG. 2 is an enlarged view of a portion of the seating system of FIG. 1A illustrating the mounting leg as positioned over an associated mounting member and the isolator in a disengaged condition.

With additional reference to FIG. 2, the receiving aperture 92 of the isolator 42 is configured such that a stationary upper contact portion 94a is largely in contact with the pin 30a during the installation of the seating system 10 to the mini-van 12 while a movable lower contact portion 94b is spaced apart from an associated side wall 56 of the slotted aperture 52 in the mounting leg 50.

Figure 3:
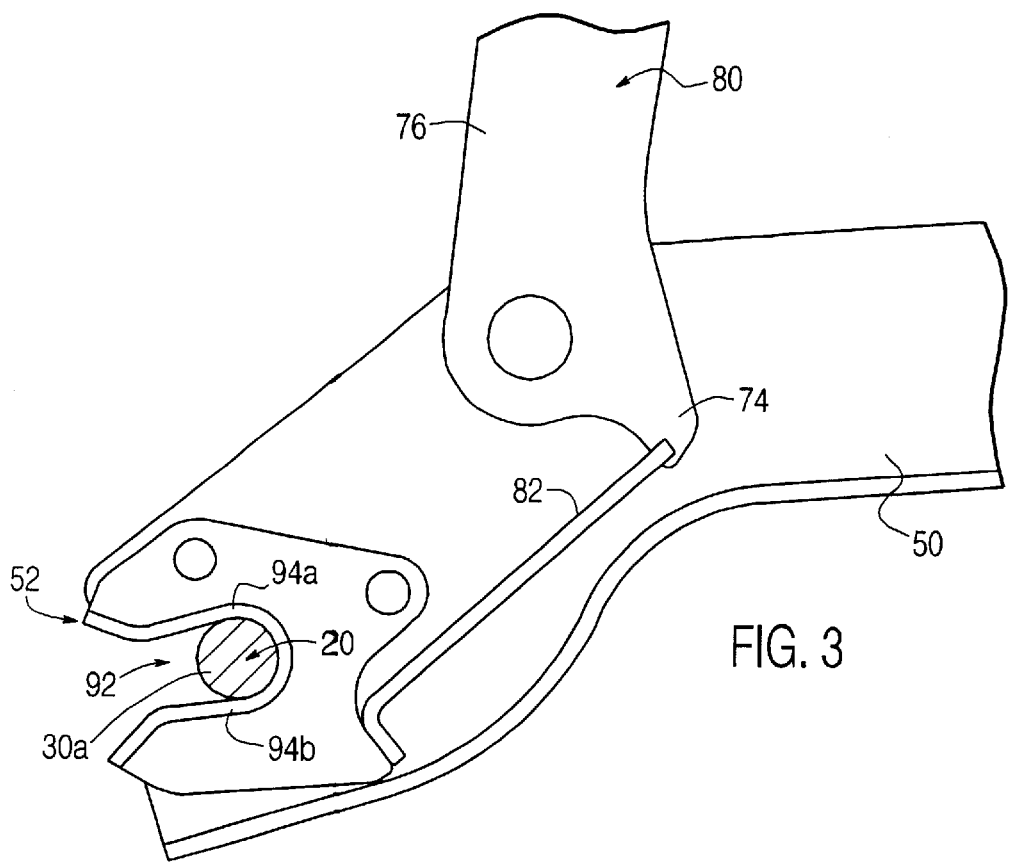
FIG. 3 is a view similar to that of FIG. 2 but illustrating the isolator in an engaged condition.

As shown in FIGS. 1B, 2 and 3, rotation of the seat back 72 toward the raised position generates motion within the linkage assembly 80 that causes the compression lever 74 to rotate in a first rotational direction and position the isolator 42 into an engaged condition wherein at least a portion of the isolator 42 (i.e., the lower contact portion 94b) is compressed against the pin 30a to thereby resist the tendency of seating system 10 to tip about one of the plurality of mounting members 20. Similarly, rotation of the seat back 72 toward the lowered position generates motion within the linkage assembly 80 that causes the compression lever 74 to rotate in a second rotational direction and position the isolator 42 into a disengaged condition wherein the isolator 42 is disengaged from the pin 30a. As the receiving aperture 92 is sized larger than its associated mounting member 20, rotation of the compression lever 74 in the second rotational direction is operable for moving the lower contact portion 94b out of contact with the pin 30a so as to reduce the level of friction against the pin 30a when the mounting structure 40 is being removed from the mini-van 12.

Figure 4:
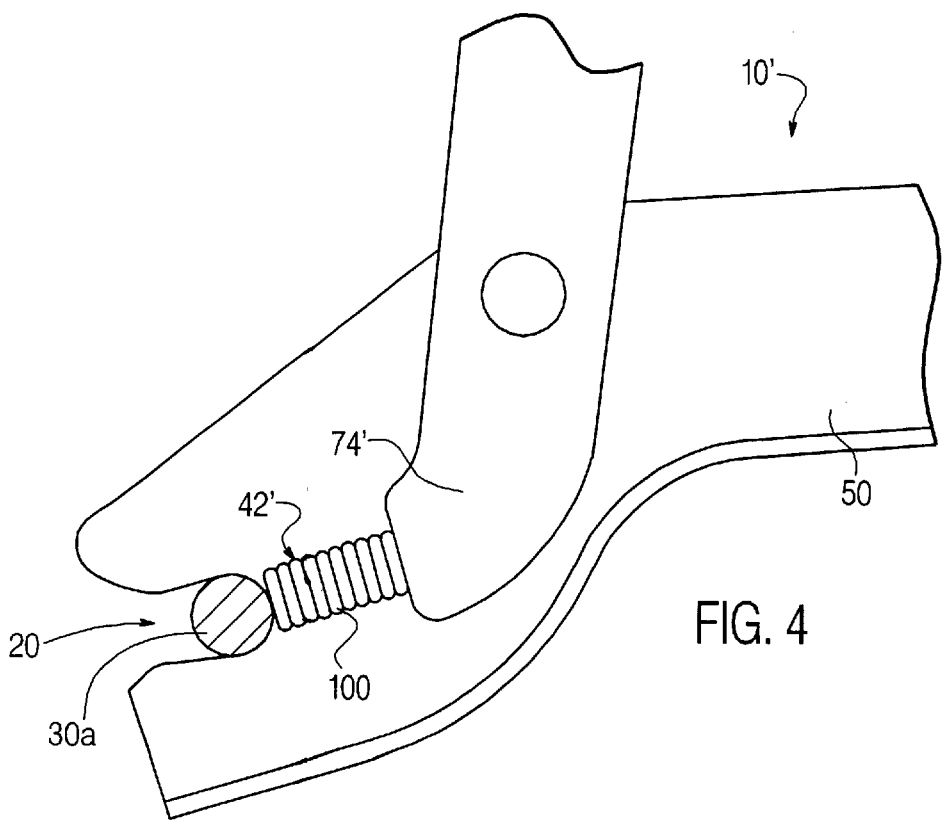
FIG. 4 is a view similar to that of FIG. 2 but illustrating an alternately configured compression lever and isolator.

While the seating system 10 has been described thus far as having a contact arm 82 for compressing an isolator 42 that is coupled to the mounting leg and formed from a resilient material, those skilled in the art will appreciate that the invention, in its broader aspects may be constructed somewhat differently. For example, the isolator 42' may be coupled to the compression lever 74' as shown in FIG. 4. In this arrangement, the isolator 42' is a compression spring 100 that is fixedly coupled to the compression lever 74'. Rotation of the compression lever 74' in the first rotational direction causes the compression spring 100 to contact pin 30a and exert a force thereon which resists the tipping of the seating system 10'. Rotation of the compression lever 74' in the second rotational direction moves the compression spring 100 away from the pin 30a so that the mounting structure 40 may be freely removed from the pin 30a.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A seating system for a vehicle having a vehicle floor, the seating system comprising a mounting member and a frame assembly, the mounting member being adapted to be fixedly coupled to the vehicle floor, the frame assembly having a mounting structure with a mounting leg, an isolator and a compression lever, the mounting leg having a slotted aperture into which a portion of the mounting member is disposed, the isolator being coupled to one of the mounting leg and the compression lever, the compression lever being pivotally mounted to the mounting structure and including a vertical support member for supporting a generally horizontal seating portion, wherein rotation of the compression lever in a first rotational direction positions the isolator in an engaged condition wherein at least a portion of the isolator is compressed against the mounting member and wherein rotation of the compression lever in a second rotational direction positions the isolator in a disengaged condition wherein the isolator is disengaged from the mounting member.

2. The seating system of claim 1, wherein the isolator is coupled to the mounting leg and the compression lever further includes a contact arm for engaging the isolator, the contact arm being fixedly coupled to the vertical support member.

3. The seating system of claim 1, wherein the slotted aperture is defined by a pair of spaced apart side walls, the isolator having a pair of contacting portions each of which being disposed proximate an opposite one of the side walls, the contacting portions contacting the mounting member when the isolator is positioned in the engaged position.

4. The seating system of claim 3, wherein rotation of the compression lever in the second rotational direction is operable for moving at least one of the contacting portions out of contact with the mounting member.

5. The seating system of claim 3, wherein a first one of the contacting portions is stationary relative to the slotted aperture and the other one of the contacting portions rotates toward the first one of the contacting portions in response to movement of the compression lever in the first rotational direction.

6. The seating system of claim 1, wherein the isolator includes a spring.

7. A seating system for a vehicle having a vehicle floor, the seating system comprising a mounting member and a frame assembly, the mounting member being adapted to be fixedly coupled to the vehicle floor, the frame assembly having a mounting structure with a mounting leg, an isolator and a compression lever, the mounting leg having a slotted aperture into which a portion of the mounting member is disposed, the isolator including a member that is formed from a resilient material and being coupled to one of the mounting leg and the compression lever, the compression lever being pivotally mounted to the mounting structure, wherein rotation of the compression lever in a first rotational direction positions the isolator in an engaged condition wherein at least a portion of the isolator is compressed against the mounting member and wherein rotation of the compression lever in a second rotational direction positions the isolator in a disengaged condition wherein the isolator is disengaged from the mounting member.

8. The seating system of claim 7, wherein the resilient material is selected from a group of resilient materials consisting of rubber and silicone.

9. A seating system for a vehicle having a vehicle floor, the seating system comprising:

a plurality of mounting members adapted to be coupled to the vehicle floor, the plurality of mounting members being in a spaced relationship relative to one another along a longitudinal axis of the vehicle; and a frame assembly having a mounting structure, an isolator and a frame structure, the mounting structure including a mounting leg, the mounting leg having a slotted aperture into which is received a portion of a first one of the plurality of mounting members, the frame structure having a plurality of link members including a seat back, the plurality of link members collectively forming a linkage assembly that is pivotably coupled to the mounting structure, the isolator being coupled to one of the mounting leg and linkage assembly;

wherein rotation of the seat back in a first rotational direction causes the linkage assembly to move the isolator into an engaged condition wherein at least a portion of the isolator is compressed against the first one of the mounting members and wherein rotation of the seat back in a second rotational direction causes the linkage assembly to move the isolator into a disengaged condition wherein the isolator is disengaged from the first one of the mounting members.

10. The seating system of claim 9, wherein the mounting structure further includes a latch mechanism coupled to the mounting leg and being operable in a latched condition for coupling the mounting structure to a second one of the plurality of mounting members and an unlatched condition.

11. The seating system of claim 10, wherein the latch mechanism includes a hook-shaped member that is pivotably coupled to the mounting leg.

12. The seating system of claim 9, wherein the linkage assembly includes a compression lever for contacting the isolator.

13. The seating system of claim 12, wherein the plurality of link members further includes a vertical seat support having an end into which the compression lever is formed.

14. The seating system of claim 12, wherein the slotted aperture is defined by a pair of spaced apart side walls, the isolator having a pair of contacting portions each of which being disposed proximate an opposite one of the side walls, the contacting portions contacting the mounting member when the isolator is positioned in the engaged position.

15. The seating system of claim 14, wherein rotation of the compression lever in the second rotational direction is operable for moving at least one of the contacting portions out of contact with the mounting member.

16. The seating system of claim 14, wherein a first one of the contacting portions is stationary relative to the slotted aperture and the other one of the contacting portions rotates toward the first one of the contacting portions in response to movement of the compression lever in the first rotational direction.

17. The seating system of claim 9, wherein the isolator includes a member that is formed from a resilient material.

18. The seating system of claim 17, wherein the resilient material is selected from a group of resilient materials consisting of rubber and silicone.

19. The seating system of claim 9, wherein the isolator includes a spring.

* * * * *